United States Patent
Vu

(10) Patent No.: US 11,543,959 B1
(45) Date of Patent: Jan. 3, 2023

(54) METHOD FOR INSERTING HAND-WRITTEN TEXT

(71) Applicant: Lenovo (Singapore) Pte. Ltd., Singapore (SG)

(72) Inventor: Tran Minh Khuong Vu, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/831,096

(22) Filed: Jun. 2, 2022

(51) Int. Cl.
| G06F 3/04883 | (2022.01) |
| G06F 3/0354 | (2013.01) |
| G06V 30/226 | (2022.01) |
| G06V 30/18 | (2022.01) |
| G06V 30/142 | (2022.01) |

(52) U.S. Cl.
CPC ...... *G06F 3/04883* (2013.01); *G06F 3/03545* (2013.01); *G06V 30/142* (2022.01); *G06V 30/1801* (2022.01); *G06V 30/2272* (2022.01)

(58) Field of Classification Search
CPC ............ G06F 3/03545; G06F 3/04883; G06V 30/142; G06V 30/1801; G06V 30/2272
See application file for complete search history.

(56) References Cited

U.S. PATENT DOCUMENTS

| 11,429,274 B2 * | 8/2022 | Missig | .................. G06F 40/166 |
| 2020/0356254 A1 * | 11/2020 | Missig | ................ G06F 3/04842 |
| 2022/0197493 A1 * | 6/2022 | Missig | ..................... G06T 13/80 |

FOREIGN PATENT DOCUMENTS

| KR | 20220102263 A | * | 7/2022 | ......... G06F 3/03545 |
| WO | WO-2020227445 A1 | * | 11/2020 | ......... G06F 3/03545 |
| WO | WO-2022154423 A1 | * | 7/2022 | |

* cited by examiner

*Primary Examiner* — Michael Pervan
(74) *Attorney, Agent, or Firm* — Osha Bergman Watanabe & Burton LLP

(57) ABSTRACT

A method and system for inserting hand-written text is disclosed. The method includes detecting, from a stylus, an insertion gesture on a touch screen, determining, on the touch screen, an insertion location where the hand-written text is to be inserted, generating, on the touch screen, an insertion box for receiving the hand-written text from the stylus, detecting, from the stylus, the hand-written text in the insertion box, and, in response to determining that the hand-written text nears or exceeds a boundary of the insertion box, increasing a size of the insertion box to accommodate the hand-written text. The method further includes detecting, from the stylus, a completion gesture on the touch screen, reducing the size of the insertion box to encapsulate the inserted hand-written text, and erasing the insertion box and inserting the hand-written text into a space previously occupied by the insertion box.

15 Claims, 8 Drawing Sheets

METHOD FOR INSERTING HAND-WRITTEN TEXT

BACKGROUND

Note-taking applications are one of the most popular applications on pen-based devices. When using note-taking applications, users may need to edit the contents by erasing, selecting, and inserting text. Some applications allow users to perform these operations by gestures. Current technology allows for using gestures to insert typed text between other typed text, or to convert handwritten text into typed text and insert it between other typed text.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, one or more embodiments relate to a method for inserting hand-written text. The method includes detecting, from a stylus, an insertion gesture on a touch screen, determining, on the touch screen, an insertion location where the hand-written text is to be inserted, generating, on the touch screen, an insertion box for receiving the hand-written text from the stylus, detecting, from the stylus, the hand-written text in the insertion box, and, in response to determining that the hand-written text nears or exceeds a boundary of the insertion box, increasing a size of the insertion box to accommodate the hand-written text. The method further includes detecting, from the stylus, a completion gesture on the touch screen, reducing the size of the insertion box to encapsulate the inserted hand-written text, and erasing the insertion box and inserting the hand-written text into a space previously occupied by the insertion box.

In general, one or more embodiments relate to a non-transitory computer readable medium storing instructions executable by a computer processor with functionality for inserting hand-written text. The instructions include functionality for detecting, from a stylus, an insertion gesture on a touch screen, determining, on the touch screen, an insertion location where the hand-written text is to be inserted, generating, on the touch screen, an insertion box for receiving the hand-written text from the stylus, detecting, from the stylus, the hand-written text in the insertion box, and, in response to determining that the hand-written text nears or exceeds a boundary of the insertion box, increasing a size of the insertion box to accommodate the hand-written text. The instructions further include functionality for detecting, from the stylus, a completion gesture on the touch screen, reducing the size of the insertion box to encapsulate the inserted hand-written text, and erasing the insertion box and inserting the hand-written text into a space previously occupied by the insertion box.

In general, one or more embodiments relate to a system comprising a stylus with a touch-sensitive screen and a computer processor with functionality for inserting hand-written text. The system detects, from a stylus, an insertion gesture on a touch screen, determines, on the touch screen, an insertion location where the hand-written text is to be inserted, generates, on the touch screen, an insertion box for receiving the hand-written text from the stylus, detects, from the stylus, the hand-written text in the insertion box, and, in response determining that the hand-written text nears or exceeds a boundary of the insertion box, increases a size of the insertion box to accommodate the hand-written text. The system further detects, from the stylus, a completion gesture on the touch screen, reduces the size of the insertion box to encapsulate the inserted hand-written text, and erases the insertion box and inserts the hand-written text into a space previously occupied by the insertion box.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
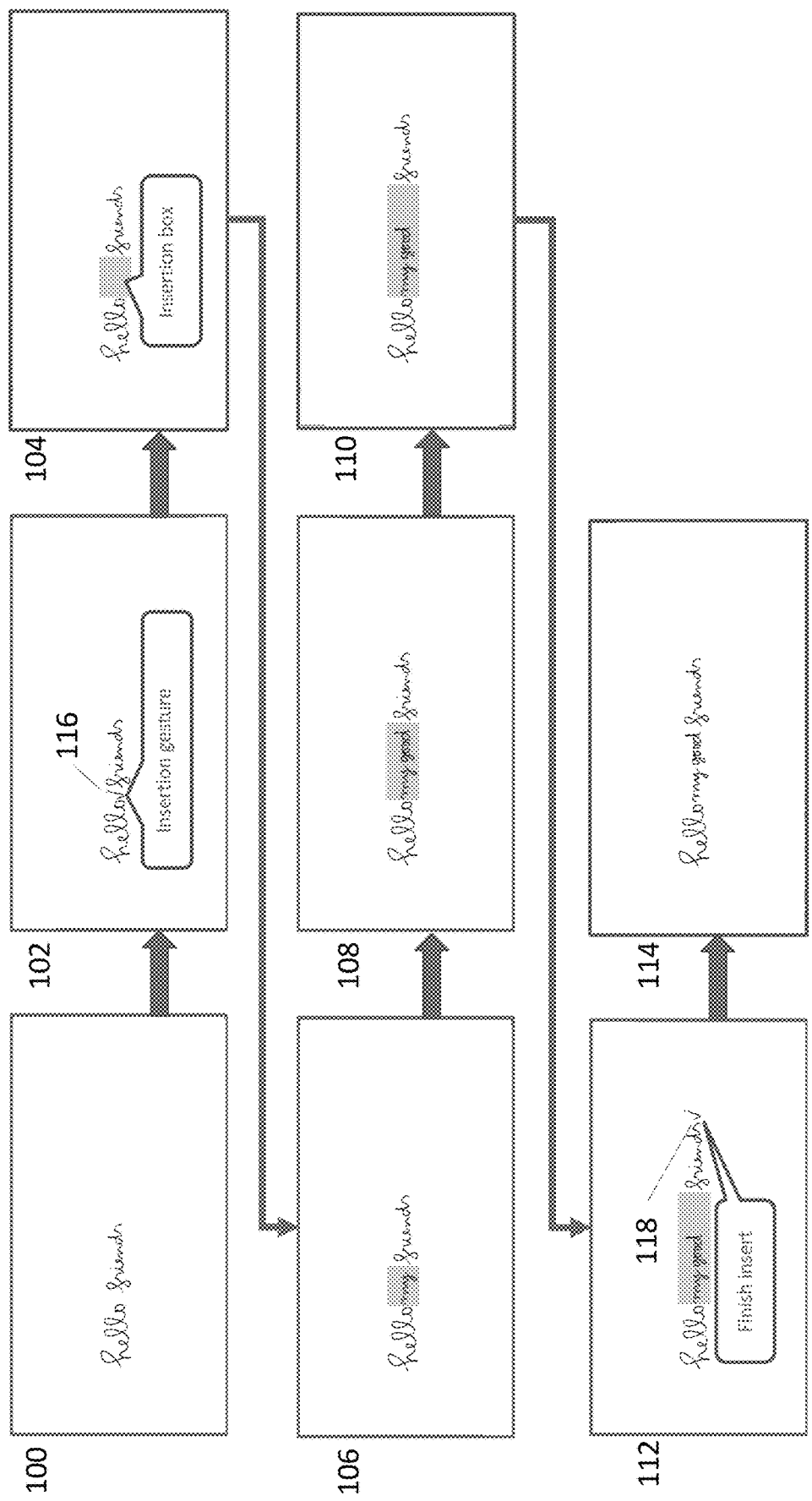
FIG. 1 depicts a text insertion process according to one or more embodiments of the present invention.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, a method in accordance with one or more embodiments allows a user to insert hand-written text between other hand-written text on a touch screen using an insertion gesture from a stylus. The insertion gesture activates an insertion mode and creates an insertion box into which new hand-written text may be added. Multiple insertion boxes may be created simultaneously by marking an insertion gesture between different pairs of words on the touch screen. If new hand-written text within an insertion box nears or exceeds the boundary of the insertion box, the insertion box is enlarged. Once a completion gesture is marked with the stylus (or, alternatively, an insertion gesture is marked at the end of a line of text), all insertion boxes are reduced to encapsulate the new hand-written text, and then the insertion boxes are erased. The insertion mode is then exited, and the user may continue to add hand-written text to the screen.

Advantageously, according to one or more embodiments of the invention, the hand-written text inserted by the user with the stylus remains hand-written and can be inserted between other hand-written text without any of the text (existing or inserted) being converted to typed text. This is a practical improvement over conventional technologies limited to typed text insertion, i.e., inserting typed text between existing typed text or converting hand-written text to typed text before insertion.

A stylus is used to mark an ink stroke on a touch screen. In one or more embodiments, the stylus may be a user's finger or any manual writing instrument whose marks can be recorded on a touch screen. In one or more embodiments, an "ink stroke" may refer to any hand-written marks recorded on any medium. Also, in one or more embodiments, a "special gesture" is an ink stroke that executes a special command from a computer, possibly changing its mode of operation, and an "insertion gesture" is a special gesture that informs a computer connected to the touch screen to change its mode of operation to insertion mode (or, in one or more embodiments, to exit insertion mode, when the insertion gesture appears at the end of a line of text). Further, in one or more embodiments, a "completion gesture" is an ink stroke that informs a computer connected to the touch screen to exit the insertion mode.

FIG. 1 presents one example of a step-by-step depiction of the invention according to one or more embodiments. FIG. 1 shows Screens (100)-(114) as displayed on a touch screen of a computing device. In Screen (100), hand-written text "hello friends" is displayed. Screen (102) shows where an ink stroke in the shape of an insertion gesture (116) was marked on the touch screen with a stylus, which initiated an insertion mode on the touch screen as shown in Screen (104). Specifically, Screen (104) shows an insertion box created between "hello" and "friends" as a result of the insertion gesture. Screen (106) shows new hand-written text ("my") added with the stylus in the insertion box. In this embodiment, the insertion gesture is in the form of a check mark. However, the insertion gesture may take many forms including, but not limited to, a circle, a slash, a spiral, or a V. In Screen (108), more hand-written text ("good") is added with the stylus and, as the combined hand-written text ("my good") nears or exceeds the boundary of the insertion box, the size of the insertion box increases to accommodate the additional hand-written text. Without limitation, the increase of the size of the insertion box that occurs when hand-written text is added may occur continuously (i.e., as the new hand-written text extends pixel-by-pixel, the boundary of the insertion box similarly extends pixel-by-pixel), or in discrete steps (i.e., when the boundary of the insertion box is approached or crossed by the new hand-written text, a pre-specified number of pixels are added to the size of the insertion box). The increase of the size of the insertion box is shown in Screen (110), with the increased insertion box extending beyond the word "good" to allow room for more handwritten text. The insertion box may also extend to the next line of the screen if the border of the page is reached. Additionally, multiple insertion boxes may be simultaneously active on the same screen.

In Screen (112), another insertion gesture is marked by the stylus at the end of the line of text. In one or more embodiments, this causes the touch screen to exit the insertion mode. In one or more embodiments, the ink stroke added with the stylus may be in the shape of a completion gesture (118), causing the touch screen to exit the insertion mode. Exiting insertion mode causes the insertion box to reduce in size to encapsulate the hand-written text that has been inserted while in insertion mode. The resized insertion box is then removed, leaving behind the hand-written text, "hello my good friends," in the space previously occupied by the insertion box. The hand-written text, "hello my good friends," includes the newly inserted text ("my good") between the existing text ("hello friends"), as shown on Screen (114). The completion gesture (or, alternatively, the insertion gesture at the end of a line of text) simultaneously removes all insertion boxes, encapsulating the new hand-written text within them.

Figure 2A:
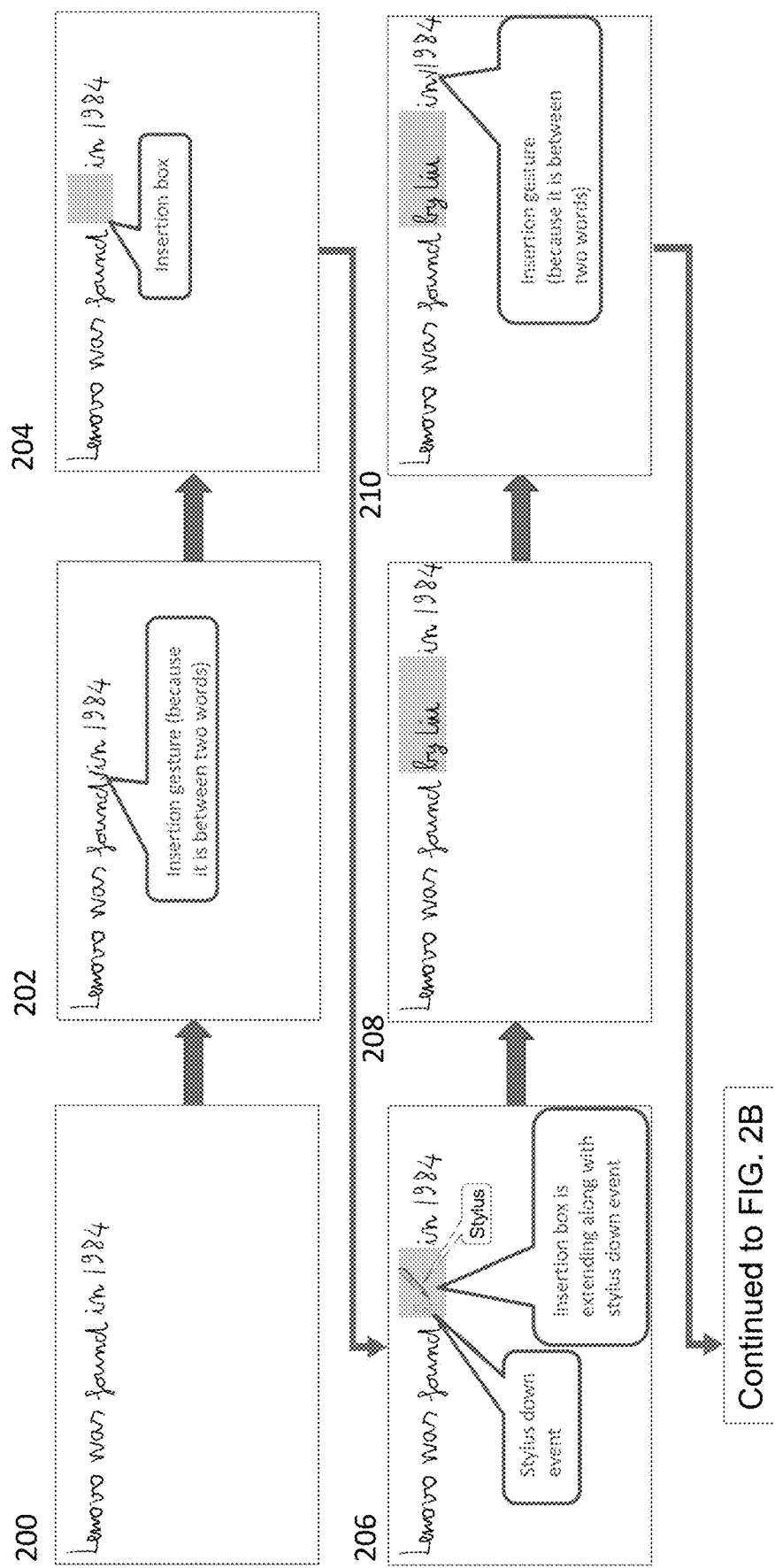
FIG. 2A and 2B depict a text insertion process according to one or more embodiments of the present invention.

FIG. 2A depicts the first six steps of another example of a step-by-step depiction of the invention according to one or more embodiments. FIG. 2A shows Screens (200)-(210) as displayed on a touch screen of a computing device. Screen (200) shows text stating, "Lenovo was found in 1984." Screen (202) shows an insertion gesture placed by the stylus between the words "found" and "in." Since the insertion gesture occurs between two words, insertion mode is activated. Screen (204) shows the insertion box created between the two words "found" and "in." Screen (206) shows a stylus down event within the insertion box where the stylus makes contact with the touch screen. The insertion box increases in size as the ink stroke of the stylus moves across the insertion box. In Screen (208), the stylus is lifted off the touch screen, leaving the hand-written text, "by Liu," in the insertion box. The insertion box contains an excess of empty space after the word "Liu." In Screen (210), another insertion gesture is marked with the stylus between the words "in" and "1984."

Figure 2B:
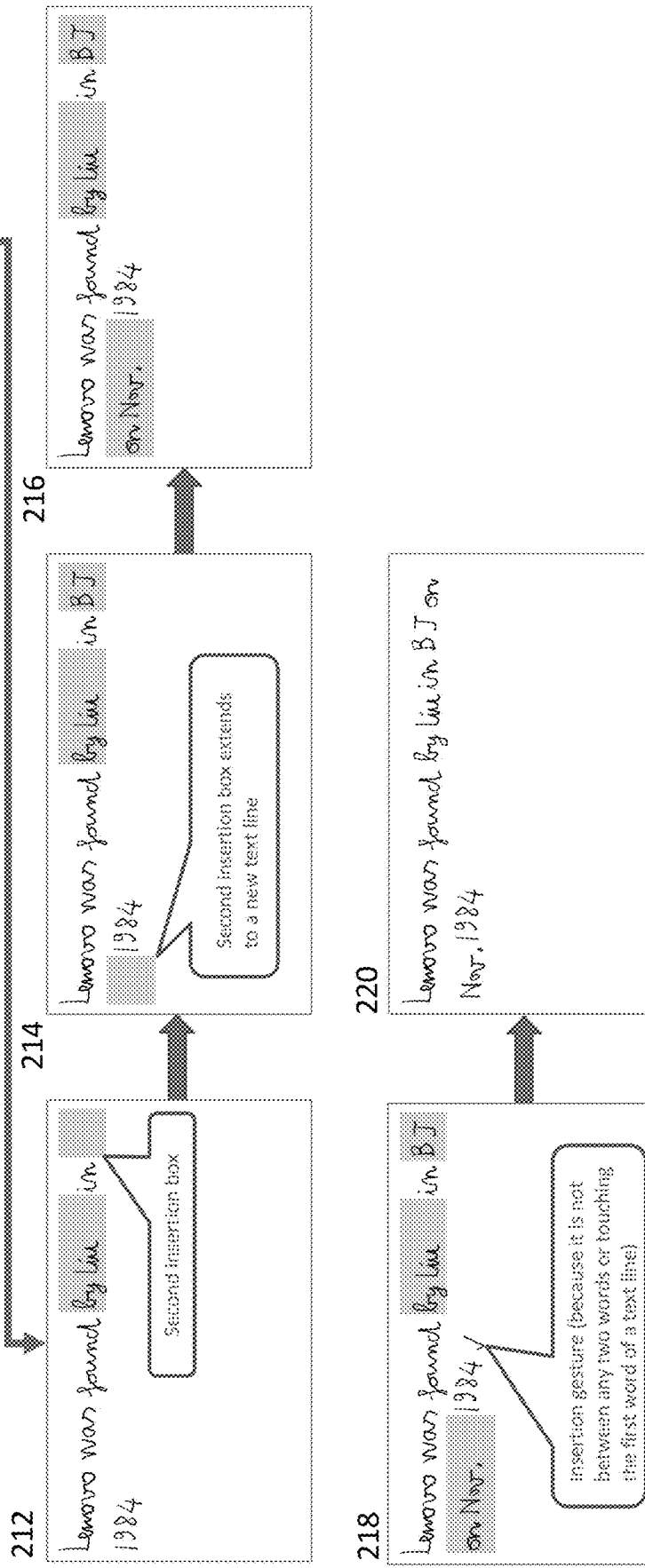

FIG. 2B continues the example of FIG. 2A, with Screens (212)-(220) representing the last five steps of a step-by-step example of the invention. In Screen (212), a second insertion box has been created between the words "Liu" and "1984" due to the insertion gesture in Screen (210). In Screen (214), the text "BJ" has been written with the stylus; the writing of this text causes the insertion box to extend to the following line. In Screen (216), the text, "on Nov." has been added to the insertion box. In Screen (218), an insertion gesture has been marked by the stylus at the end of the line of text. In one or more embodiments, this signals to the computer processor that the ink stroke should be treated as a completion gesture. In Screen (220), insertion mode is exited, the insertion boxes are reduced in size to encapsulate the hand-written text within them, and the insertion boxes are erased. In this embodiment, the completion gesture is identical to the insertion gesture but, in general, the ink strokes for each gesture may be different.

Figure 3:
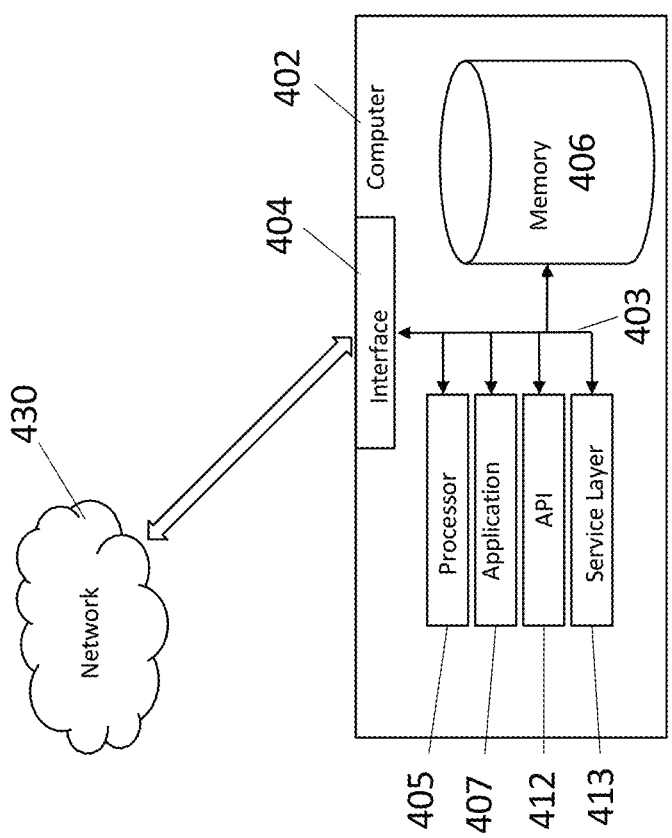
FIG. 3 depicts a computer system for implementing one or more embodiments of the present invention.

FIG. 3 depicts a block diagram of a computer system (402) used to provide computational functionalities associated with described algorithms, methods, functions, processes, flows, and procedures as described herein, according to one or more embodiments. As shown, the computer (402) includes an interface (404), a computer processor (405), a memory (406), an application (407), an application programming interface (API) (412), and a service layer (413).

According to one or more embodiments, one or more components of the computer system (402) may be used to perform the various steps/processes described below. Additional details regarding FIG. 3 and the computer system (402) will be described later.

Figure 4:
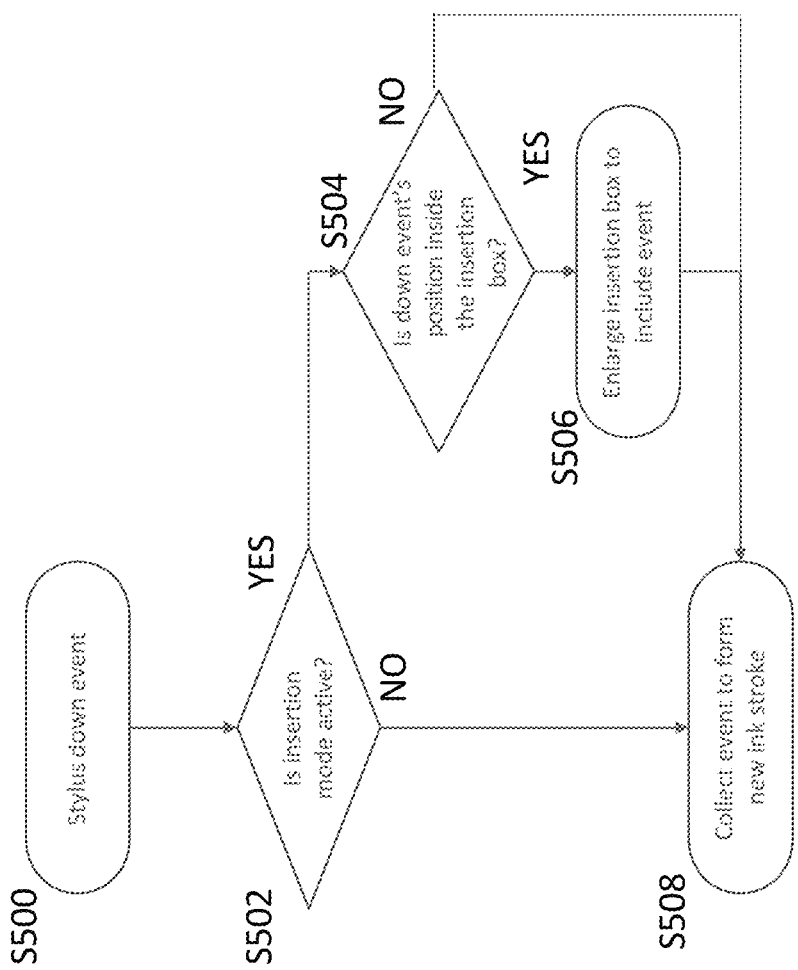
FIG. 4 shows a flowchart to determine the nature of a stylus down event according to one or more embodiments of the present invention.

FIG. 4 shows a flowchart for a stylus down event (S500) according to one or more embodiments. A "stylus down event" is one where the stylus is detected making contact with the touch screen after being separated from it. The flowchart of FIG. 4 may be implemented, for example, by the computer processor (405), but one or more of the individual steps may be omitted, repeated, and/or performed in a different order than the order shown. Unless specifically provided otherwise herein, the same is true for other workflows/flowcharts shown in other figures. Accordingly, the scope of the invention should not be limited by the specific arrangements of steps as depicted in any particular figure.

Returning to FIG. 4, first, the computer processor (405) determines whether the insertion mode is currently active (S502). If the insertion mode is active, the computer processor (405) determines whether the stylus down event occurs inside the insertion box (S504). If the stylus down event occurs inside of the insertion box, the size of the insertion box extends to contain the ink stroke (108, S506); the computer processor then records the new ink stroke (S508). If the text is outside of the insertion box, the computer processor (405) records a new ink stroke event without increasing the size of the insertion box (S508).

Figure 5:
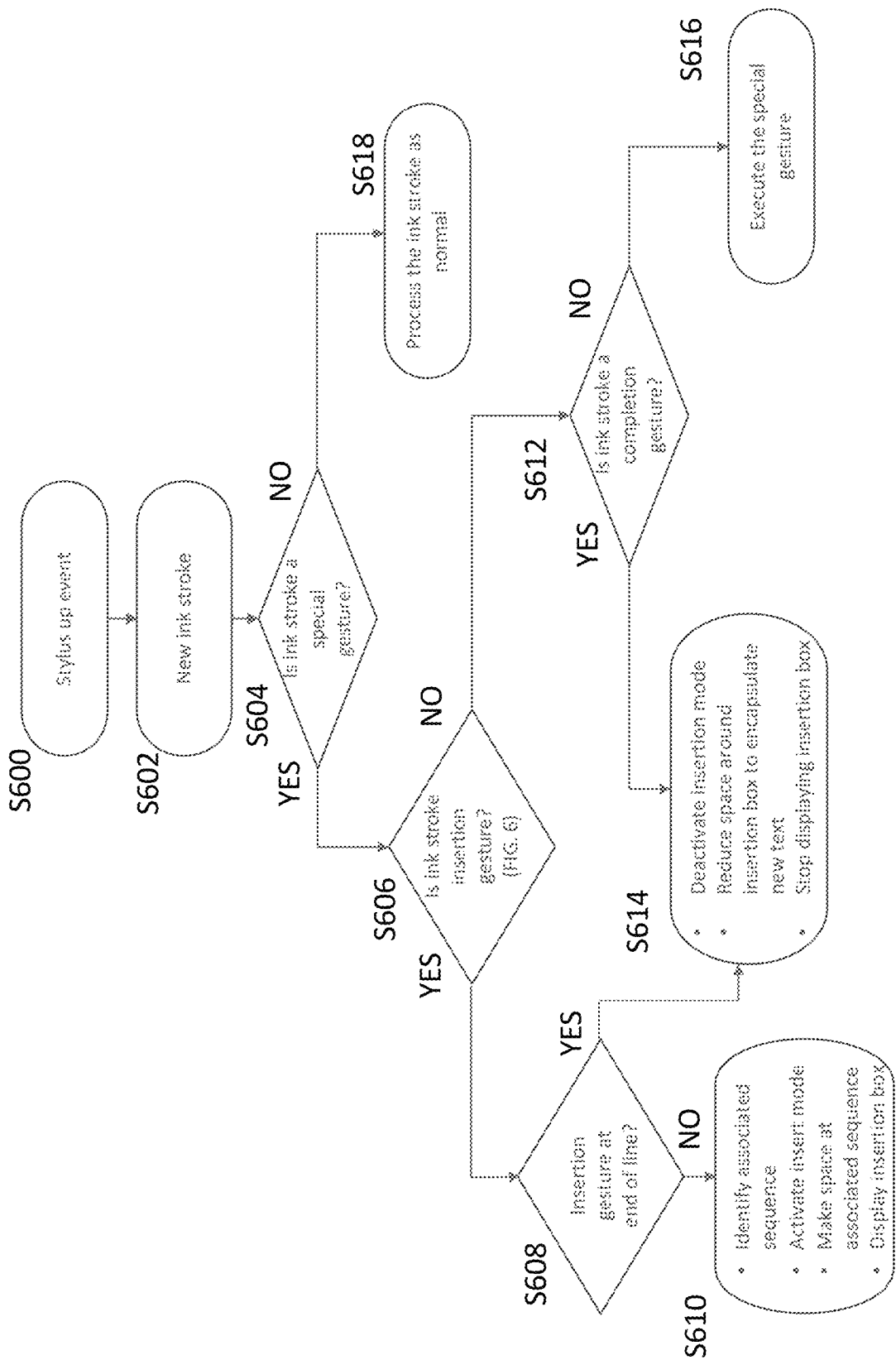
FIG. 5 shows a flowchart to determine the nature of a stylus up event according to one or more embodiments of the present invention.

FIG. 5 shows a flowchart for the stylus up event according to one or more embodiments. A "stylus up event" is when the stylus is lifted up from the touch screen (S600), thereby breaking contact with it. This defines a new ink stroke (S602). The computer processor (405) subsequently determines whether the ink stroke is a special gesture (S604). If it is not, the ink stroke is processed as if it is normal hand-written text (S618). If the ink stroke is a special gesture, the left branch of the flowchart is followed; this step is presented in greater detail in FIG. 6, below. In Step (S606), it is determined whether the special gesture is an insertion gesture (102, 116). If the computer processor (405) determines the ink stroke to be an insertion gesture (102, 116), Step (S608) determines whether the insertion gesture occurs at the end of a line of text. If so, insertion mode is deactivated, all insertion boxes are reduced to encapsulate the text they contain, and the insertion boxes are erased (Step S614). If, in Step (S608), the insertion gesture does not occur at the end of a line of text, the computer processor (405) identifies the associated sequence, the insertion mode is activated (if it is not already active), a space is made before the associated sequence, and an insertion box is displayed on the touch screen (Step S610). In one or more embodiments, an "associated sequence" is a sequence following the insertion gesture where space must be created to allow for the insertion of new hand-written text.

Returning to Step (S606), if the ink stroke is not an insertion gesture, the flowchart moves to Step (S612), where the computer processor (405) determines if the ink stroke is a completion gesture (112, 118). If the ink stroke is a completion gesture, the computer processor (405) deactivates insertion mode, reduces the size of all insertion boxes to only encapsulate new hand-written text, and then erases the insertion boxes (S614), leaving the new hand-written text inserted next to each associated sequence (114). If, in Step (S612), the ink stroke gesture is not a completion gesture, it is executed as another kind of special gesture (S616).

Figure 6:
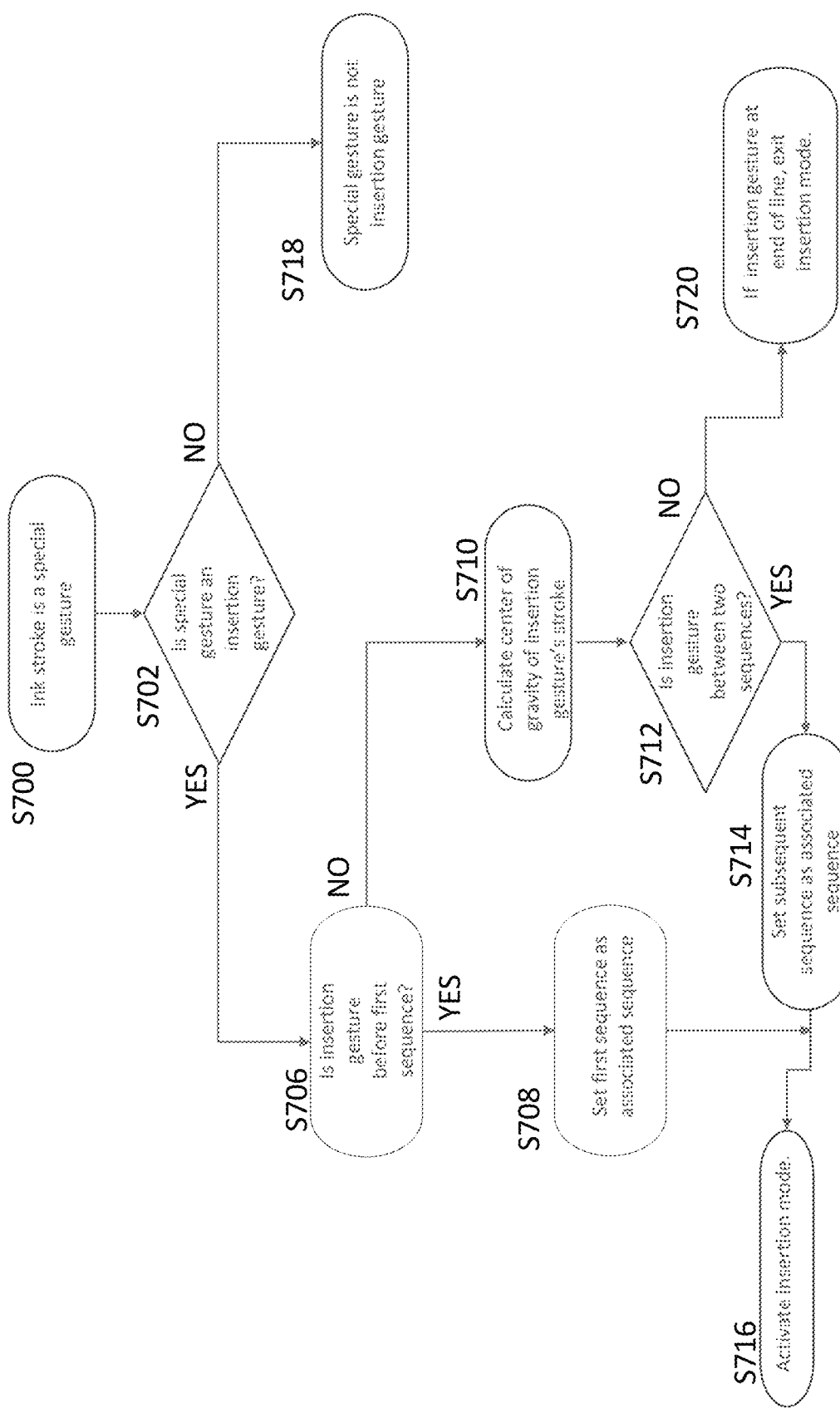
FIG. 6 shows a flowchart to determine the nature of a special gesture according to one or more embodiments of the present invention.

FIG. 6 presents more details for when an ink stroke is a special gesture (S700) according to one or more embodiments. First, the computer processor (405) determines whether the special gesture is the insertion gesture (102, 116, S702). If it is not, the special gesture is not an insertion gesture, and no further action is necessary (S718). If the computer processor determines that the special gesture is the insertion gesture (102, 116), then the computer processor (405) checks whether the insertion gesture is before the first sequence on the line (S706). If so, the first sequence becomes the associated sequence (S708) and insertion mode is activated (if it not already active) (S716). If an insertion box is inserted, the location of the insertion box will be before the associated sequence. If, in Step (S706), the insertion gesture is not before the first sequence of the line, then the computer processor (405) calculates the center of gravity of the ink stroke (S710). If the center of gravity of the ink stroke lies between two sequences (S712), the subsequent sequence becomes the associated sequence (S714) and insertion mode is activated (S716). In one or more embodiments, a "subsequent sequence" is the later-occurring sequence of symbols among two sequences in some natural ordering in the written language recognized by the computer processor (405). If the center of gravity of the insertion gesture does not lie between two sequences, but lies at the end of the line, it is treated as a completion gesture and insertion mode is exited (S720).

Figure 7:
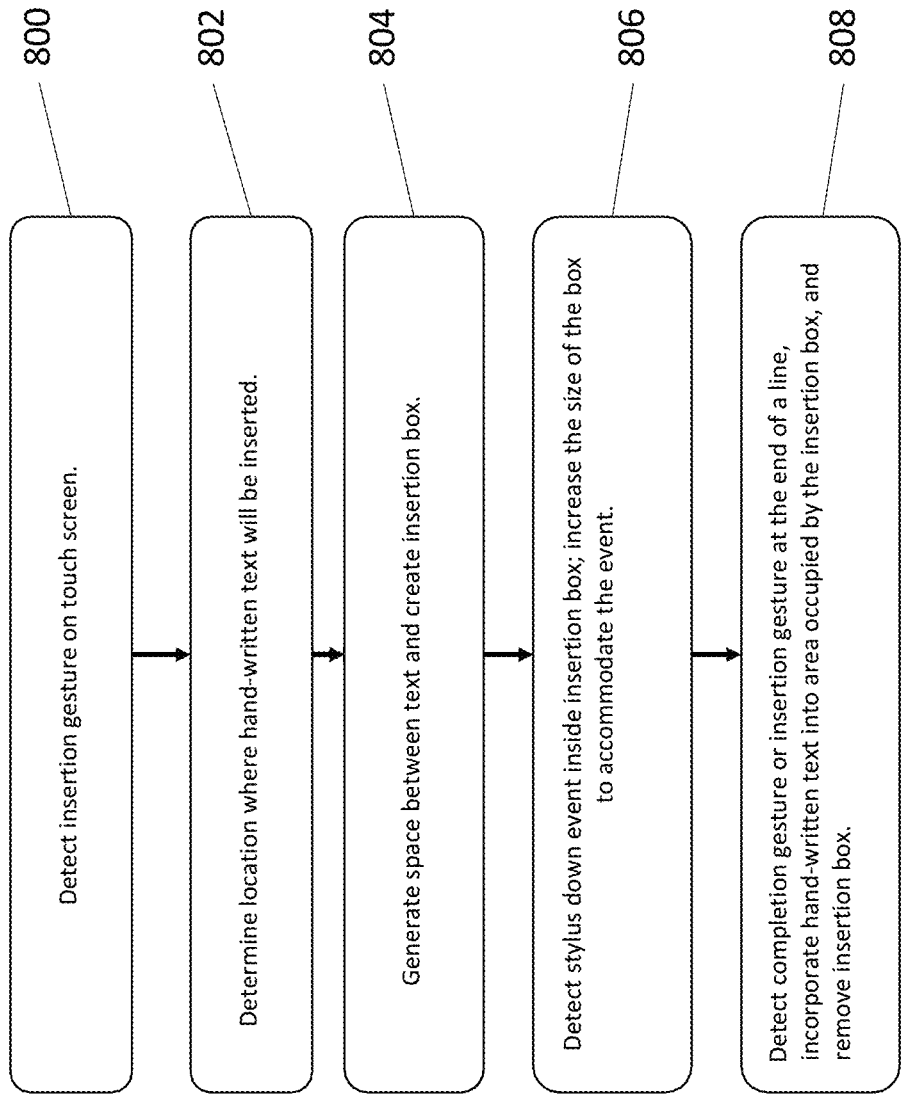
FIG. 7 shows a workflow for hand-written text insertion according to one or more embodiments of the present invention.

FIG. 7 presents the workflow of one or more embodiments of the invention. In Step (800), the computer processor (405) detects an insertion gesture (116) from a stylus on a touch screen. In Step (802), the computer processor (405) determines the location where new hand-written text will be inserted. In Step (804), the computer processor (405) creates space between sequences of text and creates an insertion box (104). In Step (806), the computer processor (405) detects hand-written text from the user and inserts it into the insertion box (106). In the case that the hand-written text nears or exceeds the boundary of the insertion box, the computer processor (405) increases the size of the insertion box so that it can contain all the new hand-written text (108). In Step (808), the computer processor (405) detects a completion gesture (118) or an insertion gesture that occurs at the end of a line. The computer processor (405) reduces the size of the insertion boxes to encapsulate only the new hand-written text that will be inserted, the insertion boxes are removed, and the new hand-written text is incorporated next to the associated sequences of each insertion box (114).

Returning to FIG. 3, the illustrated computer (402) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (402) may include an input device, such as a keypad, keyboard, touch screen, or other device that can accept user information, and an output device that conveys information associated with the operation of the computer (402), including digital data, visual, or audio information (or a combination of information), or a GUI.

The computer (402) can serve in a role as a client, network component, a server, a database or other persistency, or any other component (or a combination of roles) of a computer system for performing the subject matter described in the instant disclosure. The illustrated computer (402) is communicably coupled with a network (430). In some implementations, one or more components of the computer (402) may be configured to operate within environments, including cloud-computing-based, local, global, or other environment (or a combination of environments).

At a high level, the computer (402) is an electronic computing device operable to receive, transmit, process, store, or manage data and information associated with the described subject matter. According to some implementations, the computer (402) may also include or be communicably coupled with an application server, e-mail server, web server, caching server, streaming data server, business intelligence (BI) server, or other server (or a combination of servers).

The computer (402) can receive requests over the network (430) from a client application (for example, executing on another computer (402)) and responding to the received requests by processing the said requests in an appropriate software application. In addition, requests may also be sent to the computer (402) from internal users (for example, from a command console or by other appropriate access method), external or third-parties, other automated applications, as well as any other appropriate entities, individuals, systems, or computers.

Each of the components of the computer (402) can communicate using a system bus (403). In some implementations, any or all of the components of the computer (402), both hardware or software (or a combination of hardware and software), may interface with each other or the interface (404) (or a combination of both) over the system bus (403) using the API (412) or a service layer (413) (or a combination of the API (412) and service layer (413). The API (412) may include specifications for routines, data structures, and object classes. The API (412) may be either computer-language independent or dependent and refer to a complete interface, a single function, or even a set of APIs. The service layer (413) provides software services to the computer (402) or other components (whether or not illustrated) that are communicably coupled to the computer (402). The functionality of the computer (402) may be accessible for all service consumers using this service layer. Software services, such as those provided by the service layer (413), provide reusable, defined business functionalities through a defined interface. For example, the interface may be software written in JAVA, C++, or other suitable language providing data in extensible markup language (XML) format or another suitable format. While illustrated as an integrated component of the computer (402), alternative implementations may illustrate the API (412) or the service layer (413) as stand-alone components in relation to other components of the computer (402) or other components (whether or not illustrated) that are communicably coupled to the computer (402). Moreover, any or all parts of the API (412) or the service layer (413) may be implemented as child or sub-modules of another software module, enterprise application, or hardware module without departing from the scope of this disclosure.

The computer (402) includes an interface (404). Although illustrated as a single interface (404) in FIG. 3, two or more interfaces (404) may be used according to particular needs, desires, or particular implementations of the computer (402). The interface (404) is used by the computer (402) for communicating with other systems in a distributed environment that are connected to the network (430). Generally, the interface (404) includes logic encoded in software or hardware (or a combination of software and hardware) and operable to communicate with the network (430). More specifically, the interface (404) may include software supporting one or more communication protocols associated with communications such that the network (430) or interface's hardware is operable to communicate physical signals within and outside of the illustrated computer (402).

The computer (402) includes one or more computer processors (405). Although illustrated as a single computer processor (405) in FIG. 3, two or more processors may be used according to particular needs, desires, or particular implementations of the computer (402). Generally, the computer processor (405) executes instructions and manipulates data to perform the operations of the computer (402) and any algorithms, methods, functions, processes, flows, and procedures as described in the instant disclosure.

The computer (402) also includes a memory (406) that holds data for the computer (402) or other components (or a combination of both) that can be connected to the network (430). For example, memory (406) can be a database storing data consistent with this disclosure. Although illustrated as a single memory (406) in FIG. 3, two or more memories may be used according to particular needs, desires, or particular implementations of the computer (402) and the described functionality. While memory (406) is illustrated as an integral component of the computer (402), in alternative implementations, memory (406) can be external to the computer (402).

The application (407) is an algorithmic software engine providing functionality according to particular needs, desires, or particular implementations of the computer (402), particularly with respect to functionality described in this disclosure. For example, application (407) can serve as one or more components, modules, applications, etc. Further, although illustrated as a single application (407), the application (407) may be implemented as multiple applications (407) on the computer (402). In addition, although illustrated as integral to the computer (402), in alternative implementations, the application (407) can be external to the computer (402).

There may be any number of computers (402) associated with, or external to, a computer system containing the computer (402), wherein each computer (402) communicates over network (430). Further, the term "client," "user," and other appropriate terminology may be used interchangeably as appropriate without departing from the scope of this disclosure. Moreover, this disclosure contemplates that many users may use one computer (402), or that one user may use multiple computers (402).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method for inserting hand-written text, comprising:
   detecting, from a stylus, an insertion gesture on a touch screen;
   determining, on the touch screen, an insertion location where the hand-written text is to be inserted;
   generating, on the touch screen, an insertion box for receiving the hand-written text from the stylus;
   detecting, from the stylus, the hand-written text in the insertion box;
   in response to determining that the hand-written text nears or exceeds a boundary of the insertion box, increasing a size of the insertion box to accommodate the hand-written text;
   detecting, from the stylus, a completion gesture on the touch screen;

reducing the size of the insertion box to encapsulate the inserted hand-written text; and erasing the insertion box and inserting the hand-written text into a space previously occupied by the insertion box.

2. The method of claim 1, wherein the insertion gesture is a circle, a slash, a check, a spiral, or a V.

3. The method of claim 1, further comprising:

detecting, using a computer processor, an associated sequence and inserting the hand-written text before the associated sequence according to an ordering structure of a language in which the hand-written text is written.

4. The method of claim 1, further comprising:

determining, using a computer processor, an associated sequence and the insertion location by calculating a center of gravity of the insertion gesture.

5. The method of claim 1, wherein the completion gesture is an insertion gesture marked at an end of a line of text.

6. A non-transitory computer readable medium storing instructions executable by a computer processor to insert hand-written text, the instructions comprising functionality for:

detecting, from a stylus, an insertion gesture on a touch screen;

determining, on the touch screen, an insertion location where the hand-written text is to be inserted;

generating, on the touch screen, an insertion box for receiving the hand-written text from the stylus;

detecting, from the stylus, the hand-written text in the insertion box;

in response to determining that the hand-written text nears or exceeds a boundary of the insertion box, increasing a size of the insertion box to accommodate the hand-written text;

detecting, from the stylus, a completion gesture on the touch screen;

reducing the size of the insertion box to encapsulate the inserted hand-written text; and erasing the insertion box and inserting the hand-written text into a space previously occupied by the insertion box.

7. The non-transitory computer readable medium of claim 6, wherein the insertion gesture is a circle, a slash, a check, a spiral, or a V.

8. The non-transitory computer readable medium of claim 6, wherein the instructions further comprise functionality for:

detecting an associated sequence and inserting the hand-written text before the associated sequence according to an ordering structure of a language in which the hand-written text is written.

9. The non-transitory computer readable medium of claim 6, wherein the instructions further comprise functionality for:

determining an associated sequence and the insertion location by calculating a center of gravity of the insertion gesture.

10. The non-transitory computer readable medium of claim 6, wherein the completion gesture is an insertion gesture marked at an end of a line of text.

11. A system comprising functionality for inserting hand-written text, comprising:

a stylus with a touch-sensitive screen; and a computer processor that:

detects, from the stylus, an insertion gesture on a touch screen;

determines, on the touch screen, an insertion location where the hand-written text is to be inserted;

generates, on the touch screen, an insertion box for receiving the hand-written text from the stylus;

detects, from the stylus, the hand-written text in the insertion box;

in response to determining that the hand-written text nears or exceeds a boundary of the insertion box, increases a size of the insertion box to accommodate the hand-written text;

detects, from the stylus, a completion gesture on the touch screen;

reduces the size of the insertion box to encapsulate the inserted hand-written text; and erases the insertion box and inserts the hand-written text into a space previously occupied by the insertion box.

12. The system of claim 11, wherein the insertion gesture is a circle, a slash, a check, a spiral, or a V.

13. The system of claim 11, wherein the computer processor further detects an associated sequence and inserts the hand-written text before the associated sequence according to an ordering structure of a language in which the hand-written text is written.

14. The system of claim 11, wherein the computer processor further determines an associated sequence and the insertion location by calculating a center of gravity of the insertion gesture.

15. The system of claim 11, wherein the completion gesture is an insertion gesture marked at an end of a line of text.

* * * * *